United States Patent
Cheng et al.

(10) Patent No.: US 7,345,836 B2
(45) Date of Patent: Mar. 18, 2008

(54) ZOOM LENS DRIVING APPARATUS

(75) Inventors: Chen-Chin Cheng, Hsinchu (TW); Hsiao-Yue Tsao, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 11/707,103

(22) Filed: Feb. 16, 2007

(65) Prior Publication Data

US 2007/0139790 A1 Jun. 21, 2007

Related U.S. Application Data

(62) Division of application No. 11/092,697, filed on Mar. 30, 2005, now Pat. No. 7,199,944.

(30) Foreign Application Priority Data

Oct. 11, 2004 (TW) ............................. 93130749 A

(51) Int. Cl.
*G02B 7/02* (2006.01)
*G02B 15/14* (2006.01)
*G02B 23/14* (2006.01)
*G03B 17/00* (2006.01)
*G03B 13/10* (2006.01)

(52) U.S. Cl. .................. 359/823; 359/822; 359/696; 359/698; 359/699; 359/700; 359/432; 396/72; 396/75; 396/79; 396/83; 396/85; 396/379

(58) Field of Classification Search ............... 359/422, 359/432, 676, 694–703, 823, 824; 396/38, 396/72, 75, 79, 82, 83, 85, 107, 110, 175, 396/284, 329, 379, 445, 446, 529, 549, 552; 353/83, 116; 355/29, 73
See application file for complete search history.

(56) References Cited

U.S. PATENT DOCUMENTS

| | | | | |
|---|---|---|---|---|
| 4,076,389 A | * | 2/1978 | Bock | 359/696 |
| 4,636,041 A | | 1/1987 | Kotaka et al. | |
| 4,739,359 A | * | 4/1988 | Fukahori et al. | 396/85 |
| 4,948,235 A | * | 8/1990 | Akitake | 359/700 |
| 5,113,261 A | | 5/1992 | Morisawa et al. | |
| 5,140,468 A | | 8/1992 | Kayanuma | |
| 5,166,829 A | | 11/1992 | Iizuka | 359/699 |
| 5,298,933 A | | 3/1994 | Chigira | |
| 5,570,149 A | | 10/1996 | Wakabayashi et al. | |
| 5,606,383 A | * | 2/1997 | Daitoku et al. | 396/60 |
| 5,621,568 A | * | 4/1997 | Hasushita et al. | 359/432 |
| 5,625,487 A | * | 4/1997 | Hasushita et al. | 359/432 |
| 5,627,683 A | | 5/1997 | Takezawa | |
| 5,636,062 A | | 6/1997 | Okuyama et al. | |
| 5,689,739 A | | 11/1997 | Yoshida et al. | |
| 5,694,624 A | * | 12/1997 | Daitoku et al. | 396/60 |
| 5,708,535 A | | 1/1998 | Orimo et al. | |
| 5,742,850 A | * | 4/1998 | Nomura et al. | 396/72 |
| 5,790,908 A | | 8/1998 | Matsuda | |
| 6,031,998 A | | 2/2000 | Shono | |

* cited by examiner

*Primary Examiner*—Loha Ben
(74) *Attorney, Agent, or Firm*—Rabin & Berdo, P.C.

(57) ABSTRACT

A zoom lens driving apparatus achieves the object of driving multiple lens groups by a single motor and low production cost. When a first lens group, which includes a first lens, moves along guide rods, a leading cam of a leading member drives a leading pin of a follower, so that the follower moves a guide pin, and moves a second lens group, which includes a second lens, along the guide rods. The relative distance between the first lens group and the second lens group is controlled by the leading cam.

6 Claims, 3 Drawing Sheets

ZOOM LENS DRIVING APPARATUS

CROSS-REFERENCE TO RELATED APPLICATION

This application is a divisional of copending application Ser. No. 11/092,697, filed Mar. 30, 2005, now U.S. Pat. No. 7,199,944, issued Apr. 3, 2007, and the right of priority of parent application is and was claimed under 35 USC §119 of Taiwanese Application No. 93130749, filed Oct. 11, 2004.

FIELD OF THE INVENTION

The invention generally relates to an apparatus for driving lens groups, and in particular relates to a single-motor apparatus for driving zoom lens groups.

BACKGROUND OF THE INVENTION

Generally, high ratio zoom lens use more than four optical lens groups, and at least two groups are movable. Because of the two moving groups, the design limitation of zoom lenses is severer, the optical design is more difficult, and the optical quality is hard to improve. On the other hand, though using more than two moving lens groups in the zoom lens may improve the freedom of optical design and improve the optical quality, it actually also adds the difficulty and cost of mechanical design. Conventional four-lens-group zoom lens with two moving groups uses two motors to drive a zooming lens group and a focus lens group respectively. Conventional four-lens-group zoom lens with three moving groups uses a cylindrical cam to move two zooming lens groups, and a motor to drive the focus lens group. The above mechanisms are complicated, the component fabrications are difficult and the costs are high.

Different kinds of zoom lenses are disclosed in U.S. Pat. Nos. 4,636,041, 4,948,235, 5,140,468, 5,298,933, 5,570,149, 5,627,683, 5,636,062, 5,689,739, 5,708,535, 5,790,908 and 6,031,998. A part of them are technically reviewed as follows.

U.S. Pat. No. 5,140,468 discloses a zoom lens of four lens groups, in which three groups are movable. Two planar cams driven by two motors control the relative positions of the three moving lens groups. Because the moving directions of the planar cams are perpendicular to the optical axis, they occupy much space and are hard to be miniaturized.

U.S. Pat. No. 5,298,933 discloses a zoom lens of four lens groups, in which the first group and the third group are fixed groups; the second group and the fourth group are moving groups respectively driven by a motor. It has advantages of simple structure and low cost. However, the second group and the fourth group use different rails, and the optical design is also strict.

U.S. Pat. No. 5,627,683 discloses a zoom lens of four lens groups that are all moving groups. Each moving group is actuated by a cam ring or a thread ring, the mechanism is complicated and costs high.

U.S. Pat. No. 5,636,062 discloses a zoom lens of four lens groups. It uses a crank member to drive two lens groups.

U.S. Pat. No. 5,689,739 discloses a zoom lens of four lens groups. It uses a specific drive mechanism including a cam lever and two cam pins. The drive mechanism is hard to be miniaturized.

U.S. Pat. No. 5,708,535 discloses a zoom lens of four lens groups, in which the first group and the third group are fixed groups; the second group and the fourth group are moving groups respectively driven by a motor. It has advantages of simple structure and low cost. However, the second group and the fourth group use different rails.

U.S. Pat. No. 6,031,998 discloses a zoom lens of four lens groups, in which the actuator is a cylinder. The guide rail in the cylinder is not easy to be made.

SUMMARY OF THE INVENTION

In view of the aforesaid problems, the object of the invention is to provide a lens driving apparatus that drives multiple lens groups by a single motor and achieves low production cost, high freedom of optical design and high optical quality. By using a linkage, a motor driving a first lens group also drives a second lens group, and even a third lens group. The relative distances between the second lens group and the first lens group, and between the third lens group and the first lens group are controllable. Thus the invention is applicable to a zoom lens of four lens groups that uses more than two moving lens groups.

To achieve the aforesaid object, a zoom lens driving apparatus of the invention includes a first lens group, a second lens group, guide rods, a guide pin, a follower and a leading member. The first lens group includes a first lens. The second lens group includes a second lens. The guide rods pass through the first lens group and the second lens group to let the first lens group and the second lens group movable along the guide rods. The guide pin is formed on the second lens group. The follower is formed with a leading pin and a guide slot corresponding to the guide pin on the second lens group. The leading member has an end fixed to the first lens group, and is formed with a leading cam corresponding to the leading pin. When the first lens group moves along the guide rods, the leading cam of the leading member drives the leading pin of the follower, so that the follower pushes the guide pin, and moves the second lens group along the guide rod. The leading cam controls the relative distance between the first lens group and the second lens group. Therefore, the invention achieves the object of driving multiple lens groups by a single motor and low production cost.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
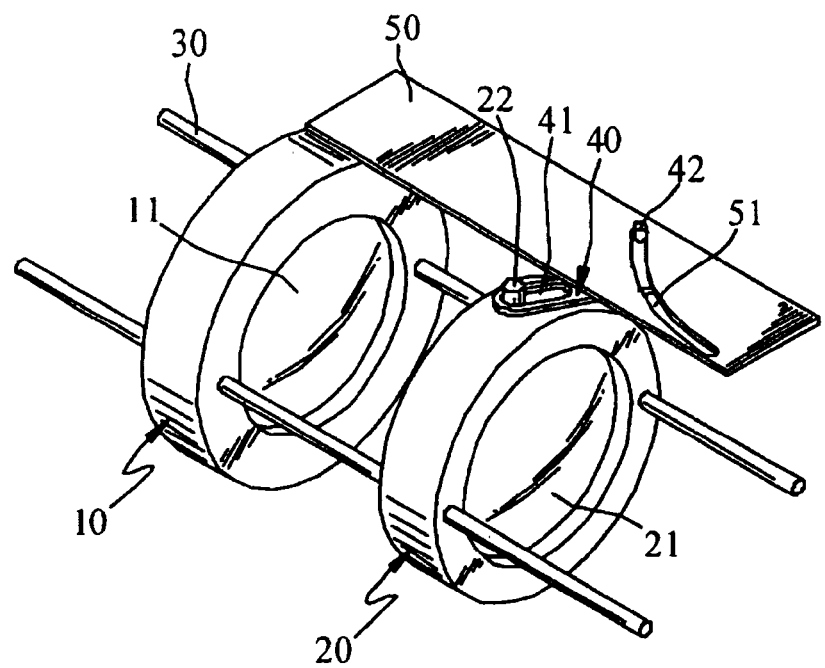
FIG. 1 is a perspective view of a first embodiment of the invention.

As shown in FIG. 1, a first embodiment of the invention, the zoom lens driving apparatus includes a first lens group 10, a second lens group 20, guide rods 30 and 35, a guide pin 22, a follower 40 and a leading member 50. The first lens group 10 includes a first lens 11. The second lens group 20 includes a second lens 21. The guide rods 30 and 35 pass through the first lens group 10 and the second lens group 20 to let the first lens group 10 and the second lens group 20 move along the guide rods 30 and 35. The guide pin 22 is formed on the second lens group 20. The follower 40 is formed with a leading pin 42 and a guide slot 41 corresponding to the guide pin 22. The leading member 50 has one end fixed to the first lens group 10, and a leading cam 51 corresponding to the leading pin 42. The leading cam 51 is a slot.

In operation, a motor (not shown) drives the first lens group 10 to move along the guide rods 30 and 35. The leading cam 51 of the leading member 50 pushes the leading pin 42 of the follower 40. The follower 40 is pivoted with a pin to a lens barrel (not shown) and rotates to move the guide pin 22 to cause the second lens group 20 to move along the guide rods 30 and 35. The relative distance between the first lens group 10 and the second lens group 20 changes according to the leading cam 51. Therefore, the first embodiment of the invention achieves the object of low production cost, high freedom of optical design and high optical quality with a single motor to drive two lens groups. Certainly, in the first embodiment, the guide pin 22 and the guide slot 41 can be interchanged. That means the guide pin 22 is formed on the follower 40 and the guide slot 41 is formed on the second lens group 20 to attain the same movement.

Figure 2:
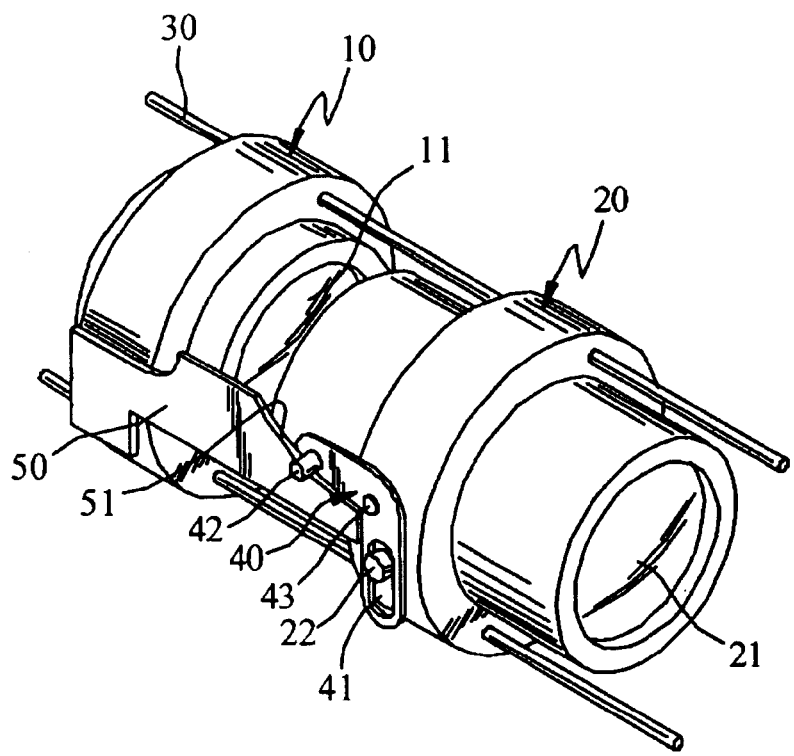
FIG. 2 is a perspective view of a second embodiment of the invention.

As shown in FIG. 2, a second embodiment of the invention, the zoom lens driving apparatus includes a first lens group 10, a second lens group 20, guide rods 30 and 35, a guide pin 22, a follower 40 and a leading member 50. The first lens group 10 includes a first lens 11. The second lens group 20 includes a second lens 21. The guide rods 30 and 35 pass through the first lens group 10 and the second lens group 20 to let the first lens group 10 and the second lens group 20 move along the guide rods 30 and 35. The guide pin 22 is formed on the second lens group 20. The follower 40 is formed with a leading pin 42 and a guide slot 41 corresponding to guide pin 22. The leading member 50 has one end fixed to the first lens group 10, and a leading cam slot 51 corresponding to the leading pin 42 on the follower. The leading cam 51 is a flat cam.

In operation, a motor (not shown) drives the first lens group 10 moving along the guide rods 30 and 35. The leading cam 51 of the leading member 50 moves the leading pin 42 of the follower 40. The follower 40 is pivoted with a pin via a hole 45 to a lens barrel (not shown) and revolves to move the guide pin 22 to cause the second lens group 20 moving along the guide rods 30 and 35. The relative distance between the first lens group 10 and the second lens group 20 changes according to the leading cam 51. Therefore, the second embodiment of the invention achieves the object of driving multiple lens groups by a single motor and low production cost. Certainly, in the second embodiment, the guide pin 22 and the guide slot 41 can be interchanged, that means the guide pin 22 is formed on the follower 40 and the guide slot 41 is formed on the second lens group 20 to attain the same movement.

Figure 3:
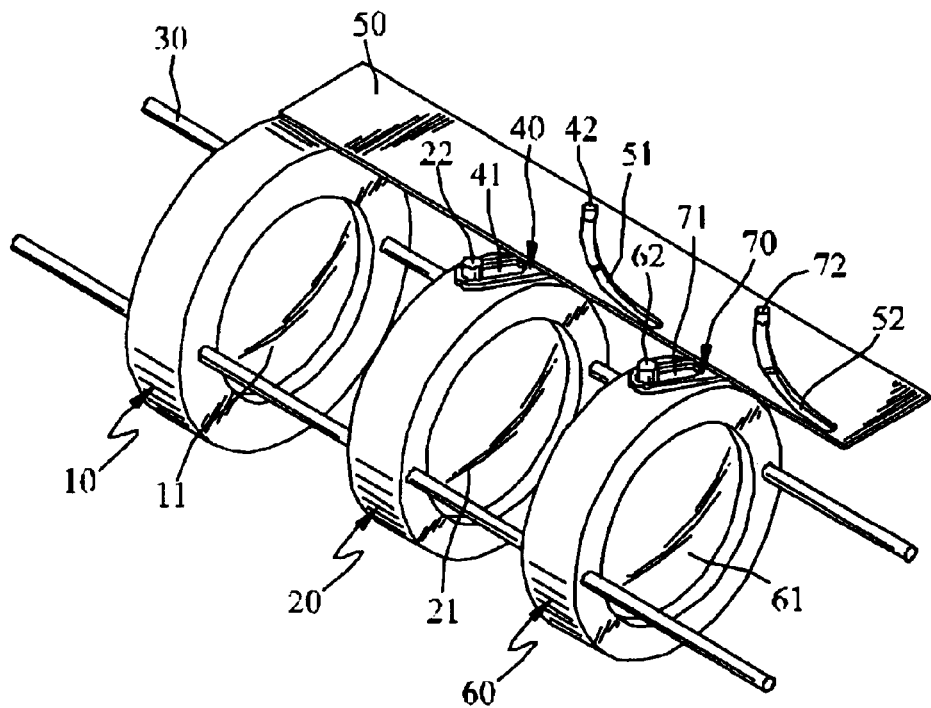
FIG. 3 is a perspective view of a third embodiment of the invention.

As shown in FIG. 3, a third embodiment of the invention, the zoom lens driving apparatus further includes a third lens group 60 having a third lens 61. Another guide pin 62 is formed on the third lens group 60. Another follower 70 is formed with another leading pin 72 and another guide slot 71 corresponding to the guide pin 62 on the third group. The leading member 50 has another leading cam 52 corresponding to the leading pin 72. The leading cam 52 is a slot.

In operation, a motor (not shown) drives the first lens group 10 moving along the guide rods 30 and 35. The leading cam 51 of the leading member 50 pushes the leading pin 42 of the follower 40. The follower 40 is pivoted on a lens barrel (not shown) and rotates to push the guide pin 22 to cause the second lens group 20 moving along the guide rods 30 and 35. The relative distance between the first lens group 10 and the second lens group 20 changes according to the leading cam slot 51. Meanwhile, the first lens group 10 also causes the third lens group 60 moving along the guide rods 30 and 35. The relative distance between the first lens group 10 and the third lens group 60 changes according to the leading cam slot 52. Therefore, the second embodiment of the invention achieves the object of driving multiple lens groups by a single motor and low production cost.

Figure 4:
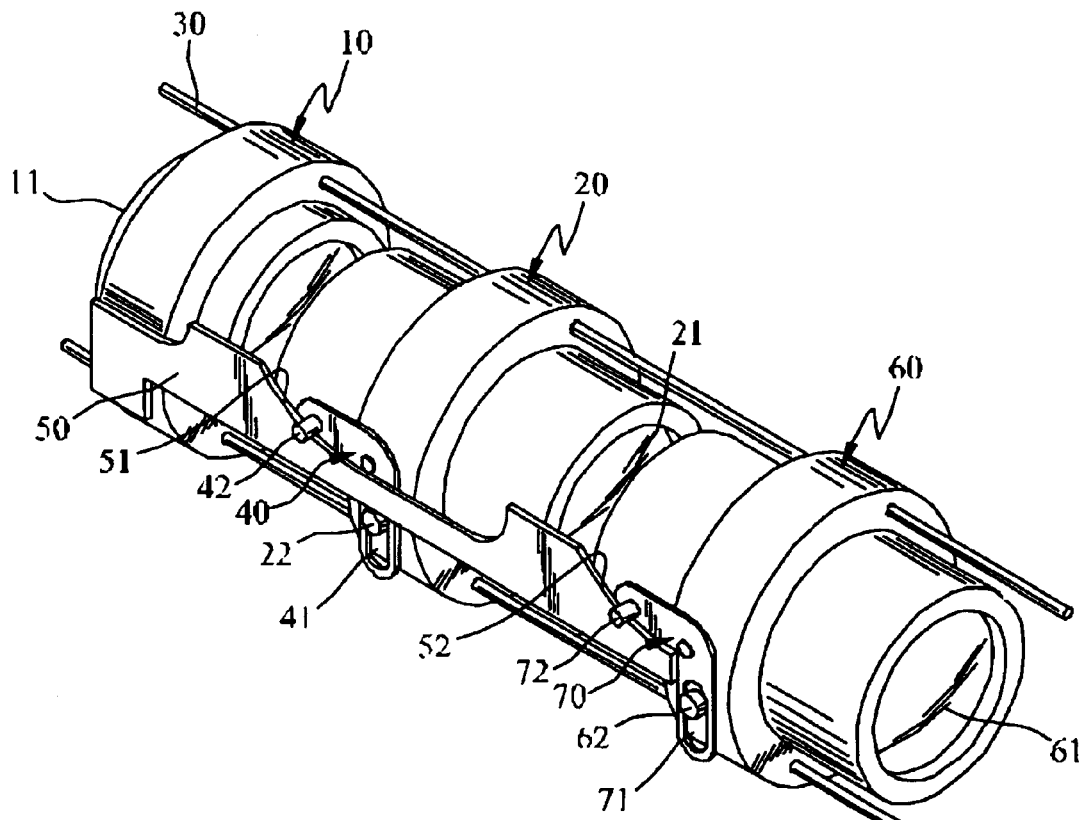
FIG. 4 is a perspective view of a fourth embodiment of the invention.

As shown in FIG. 4, a fourth embodiment of the invention, the leading cam 52 is a flat cam. Certainly, in the third or fourth embodiments, the guide pin 22 and the guide slot 41 can be interchanged, that means the guide pin 22 is formed on the follower 40, the guide slot 41 is formed on the second lens group 20, the guide pin 62 is formed on the follower 70 and the guide slot 71 is formed on the follower 70 to attain the same movement.

Figure 5:
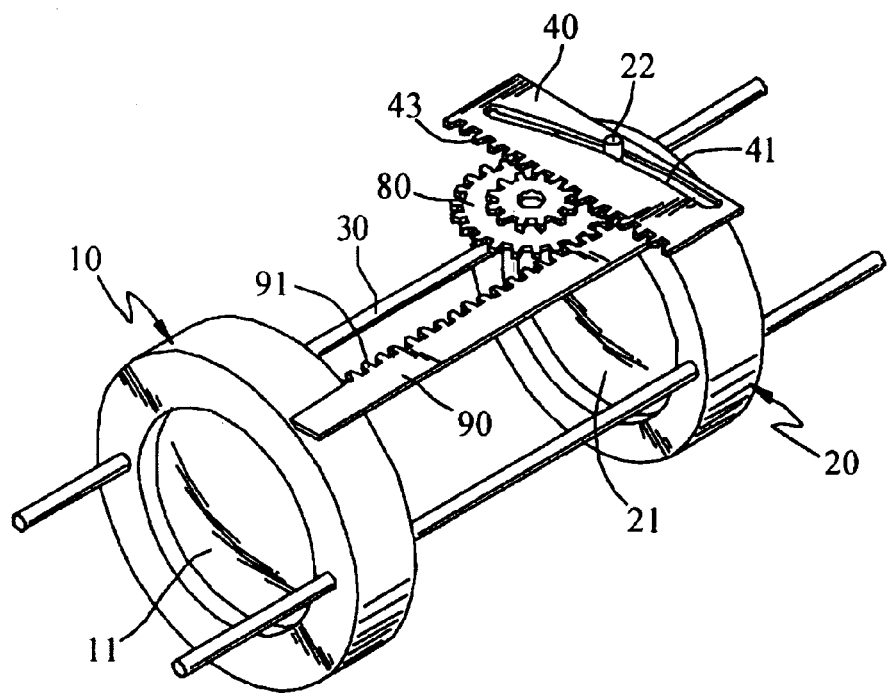
FIG. 5 is a perspective view of a fifth embodiment of the invention.

As shown in FIG. 5, a fifth embodiment of the invention, the lens driving apparatus includes a first lens group 10, a second lens group 20, guide rods 30 and 35, a guide pin 22, a follower 40, a gear cluster 80 and a rack 90. The first lens group 10 includes a first lens 11, the second lens group 20 includes a second lens 21. The guide rods 30 and 35 pass through the first lens group 10 and the second lens group 20 to let the first lens group 10 and the second lens group 20 movable along the guide rods 30 and 35. The guide pin 22 is formed on the second lens group 20. The follower 40 is formed with a guide slot 41 corresponding to the guide pin 22, and a leading rack 43 engaged with the gear cluster 80. One end of the rack 90 is fixed to the first lens group 10, and has a plurality of teeth 91 engaged with the gear cluster 80.

In operation, a motor (not shown) drives the first lens group 10 moving along the guide rods 30 and 35. The plurality of teeth 91 of the rack 90 revolves the gear cluster 80. The gear cluster 80 moves the leading rack 43 of the follower 40 and pushes the guide pin 22 via the guide slot 41 to cause the second lens group 20 moving along the guide rods 30 and 35. The relative distance between the first lens group 10 and the second lens group 20 changes according to the guide slot 41. Therefore, the fifth embodiment of the invention achieves the object of driving multiple lens groups by a single motor and low production cost. Certainly, in the fifth embodiment, the guide pin 22 and the guide slot 41 can be interchanged, that means setting the guide pin 22 on the follower 40 and setting the guide slot 41 on the second lens group 20 to attain the same movement.

Figure 6:
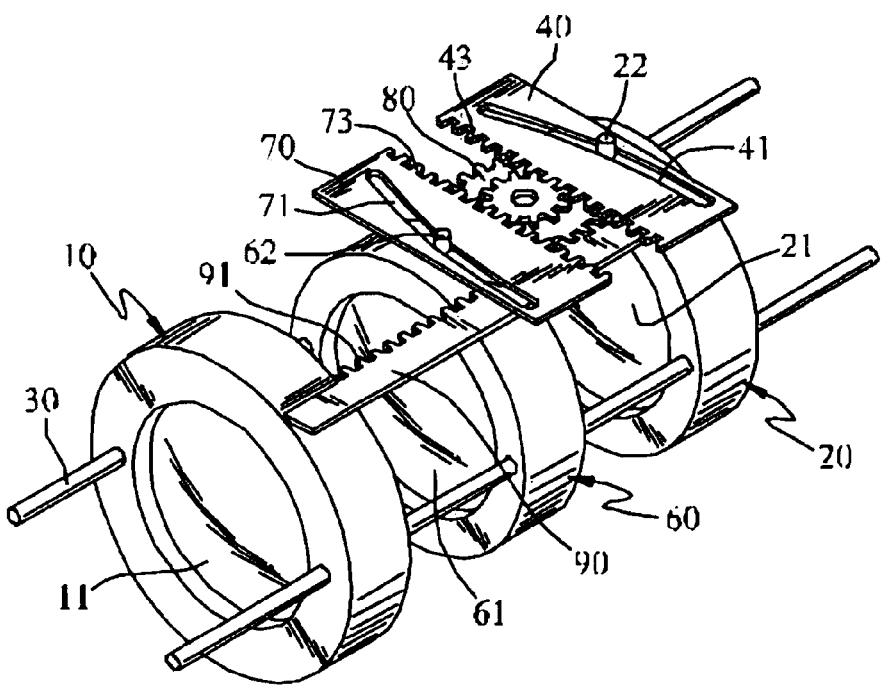
FIG. 6 is a perspective view of a sixth embodiment of the invention.

As shown in FIG. 6, a sixth embodiment of the invention, the zoom lens driving apparatus further includes a third lens group 60 having a third lens 61. Another guide pin 62 is formed on the third lens group 60. Another follower 70 is formed with a guide slot 71 corresponding to the guide pin 62, and teeth 73 engaged with the gear cluster 80. Thus the first lens group 10 also causes the third lens group 60 moving along the guide rods 30 and 35. The relative distance between the first lens group 10 and the third lens group 60 changes according to the guide slot 71.

In operation, a motor (not shown) drives the first lens group 10 moving along the guide rods 30 and 35. The plurality of teeth 91 of the rack 90 revolves the gear cluster 80. The gear cluster 80 moves the rack 43 of the follower 40 and pushes the guide pin 22 via the guide slot 41 to cause the second lens group 20 moving along the guide rods 30 and 35. The relative distance between the first lens group 10 and the second lens group 20 changes according to the guide slot 41. Meanwhile, the first lens group 10 also causes the third lens group 60 moving along the guide rods 30 and 35. The relative distance between the first lens group 10 and the third lens group 60 changes according to the guide slot 71. Therefore, the sixth embodiment of the invention achieves the object. Certainly, in the sixth embodiment, the guide pin 22 and the guide slot 41 can be interchanged, that means the guide pin 22 is formed on the follower 40, the guide slot 41 is formed on the second lens group 20, the guide pin 62 is formed on the follower 70 and the guide slot 71 is formed on the follower 70 to attain the same movement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens driving apparatus, comprising:
   a first lens group, having a first lens;
   a second lens group, having a second lens;
   at least two guide rods, passing through said first lens group and said second lens group to let said first lens group and said second lens group move along said guide rods;
   a guide pin, formed on said second lens group;
   a follower, formed with a leading rack and a guide slot corresponding to said guide pin;
   a gear cluster, engaged with said leading rack; and
   a rack, having one end fixed to said first lens group, and a plurality of teeth engaged with said gear cluster;
   wherein, upon said first lens group moving along said guide rods, said plurality of teeth of said rack revolves said gear cluster to move said leading rack of said follower, and let said guide slot move along said guide pin to cause said second lens group to move along said guide rods, resulting in a relative distance between said first lens group and said second lens group being changed according to said guide slot.

2. The lens driving apparatus of claim 1, further comprising a third lens group having a third lens, another guide pin formed on said third lens group, another follower formed with another guide slot corresponding to said another guide pin, and another leading rack engaged with said gear cluster, thereby said first lens group also causes said third lens group to move along said guide rods, and a relative distance between said first lens group and said third lens group to change according to said another guide slot.

3. The lens driving apparatus of claim 1, further comprising a third lens group having a third lens, another guide slot formed on said third lens group, another follower formed with another guide pin corresponding to said another guide slot, and another leading rack engaged with said gear cluster, thereby said first lens group also causes said third lens group to move along said guide rods, and a relative distance between said first lens group and said third lens group to change according to said another guide slot.

4. A lens driving apparatus, comprising:
   a first lens group, having a first lens;
   a second lens group, having a second lens;
   at least two guide rods, passing through said first lens group and said second lens group to let said first lens group and said second lens group move along said guide rods;
   a guide pin, formed on said second lens group;
   a follower, formed with a leading rack and a guide slot corresponding to said guide pin;
   a gear cluster, engaged with said leading rack; and
   a rack, having one end fixed to said first lens group, and a plurality of teeth engaged with a gear of said gear cluster;
   wherein, upon said first lens group moving along said guide rods, said plurality of teeth of said rack revolves said gear cluster to move said leading rack of said follower, and let said guide pin move along said guide slot to cause said second lens group to move along said guide rods, resulting in a relative distance between said first lens group and said second lens group being changed according to said guide slot.

5. The lens driving apparatus of claim 4, further comprising a third lens group having a third lens, another guide pin formed on said third lens group, another follower formed with another guide slot corresponding to said another guide pin, and another leading rack engaged with said gear cluster, thereby said first lens group also causes said third lens group to move along said guide rods, and a relative distance between said first lens group and said third lens group to change according to said another guide slot.

6. The lens driving apparatus of claim 4, further comprising a third lens group having a third lens, another guide slot formed on said third lens group, another follower formed with another guide pin corresponding to said another guide slot, and another leading rack engaged with said gear cluster, thereby said first lens group also causes said third lens group to move along said guide rods, and a relative distance between said first lens group and said third lens group to change according to said another guide slot.

* * * * *